United States Patent [19]

Pechal

[11] Patent Number: 4,564,569

[45] Date of Patent: Jan. 14, 1986

[54] BATTERY TERMINAL CONNECTOR

[76] Inventor: Frank Pechal, 519 E. St. Apt. D17, Chula Vista, Calif. 92010

[21] Appl. No.: 639,573

[22] Filed: Aug. 10, 1984

[51] Int. Cl.⁴ .......................... H01M 2/20; H01R 4/50

[52] U.S. Cl. .................................... 429/121; 429/122; 339/229; 339/240; 339/273 R; 339/274

[58] Field of Search ............................... 429/121, 122; 339/273 R, 273 F, 274, 236, 246, 247, 248, 229, 240, 228, 238

[56] References Cited

U.S. PATENT DOCUMENTS 1,666,991 4/1928 Cohen ............................ 339/274 X 1,945,437 1/1934 Krueger ............................ 339/236

2,979,650 4/1961 Godshalk et al. .............. 429/121 X 3,818,422 6/1974 Pertuit ........................... 339/274 X 3,990,769 11/1976 Bureau ............................... 336/236

FOREIGN PATENT DOCUMENTS 731424 7/1943 Fed. Rep. of Germany .

*Primary Examiner*—Anthony Skapars

*Attorney, Agent, or Firm*—Trask & Britt

[57] ABSTRACT

A connector preferably for battery terminal posts simultaneously connects and disconnects to and from both a battery post and the battery cable. The connector has a "U"-shaped conductor within a chassis and wedge members which operates to squeeze the connector about the post and grip the cable.

10 Claims, 6 Drawing Figures

BATTERY TERMINAL CONNECTOR

BACKGROUND OF THE INVENTION

1. Field

This invention relates to electrical connectors and more particularly to connectors suited for quick disconnection. specifically, this invention is directed toward a connector capable of simultaneous disconnection both from a battery post and a battery cable with said disconnection being effected without the use of other tools.

2. State of the Art

In many electrical systems, a variety of different connectors are used to electrically connect a wire or cable to a fixed terminal. In some systems, it is often desirable to remove or disconnect the wire or cable from the fixed terminal for maintenance or other purposes. For example, many conventional 12 volt (DC) batteries commonly used as an energy source for starting internal combustion engines have posts for interconnecting the battery to the associated electrical system. Batteries of this type often have two tapered posts (positive and negative) which extend away from the battery. Cables or wires are typically connected to these posts by the use of a clamp connector. The connector is tightly clamped to the post by the operation of a nut/bolt arrangement which constricts the clamp tightly onto the post. The closed end of the clamp has an extension for receiving the cable to effect an electrical (conductive) connection.

In use, it is not uncommon for the clamp and post to suffer some corrosion. On occasion, the corrosion may adversely affect the electrical connection to the point that it is either interrupted or so significantly impeded that the associated electrical system (e.g., engine starting system) does not function. Thus, the connector must be removed and cleaned or replaced. The post may also need to be cleaned. Because of the corrosion, it is sometimes difficult to loosen the nut/bolt arrangement of the clamp connector. Even when the clamp is loosened it may still be difficult to remove the connector from the terminal. Further, there is a reluctance to remove and clean the terminal post and connector on a regular basis because of the time, effort and/or cost involved. That is, tools must be obtained and operated to effect removal and cleaning. Moreover, the task can involve some risk or hazard because the battery is energized and therefore constitutes a shock hazard. Because the corrosion materials in the vicinity or on the post/clamp are caustic, they can cause damage to clothes and hands and can be a severe danger if they get into the eyes or mouth. Nevertheless, frequent cleaning of the post and connector is desired to avoid engine starting system malfunction.

In other circumstances, it is from time to time desirable to remove the battery for storage, charging and the like. For example, batteries used to start engines for earth moving equipment (e.g., graters, bulldozers) which are often left overnight in unsecured surroundings may need to be removed to avoid theft or weather damage. Power boats stored for the winter or for other periods may have the batteries removed to avoid damage and to permit remote recharging before use. Batteries or battery packs for aircraft are also typically removed for service and maintenance on a periodic basis. In such circumstances, a quick, easy and safe disconnection means is desirable since the battery, even if substantially discharged, is still a source of electrical energy and a shock hazard that cannot be deenergized while working on the connectors.

In addition to the clamp connector in widespread use today, i.e., the nut and bolt clamping system, other connectors have been devised for use in connecting cables to terminal posts such as battery posts. Typical connectors are illustrated in U.S. Pat. No. 3,990,769 (Bureau), and U.S. Pat. No. 1,945,437 (Krueger).

Krueger defines a connector having a sheath for receiving and containing the battery cable. The sheath is conjoined with a housing which includes a cylindrical recess well adapted to receive a battery post. The recess well is fitted with a movable wedge controlled by a bolt member. Krueger discloses a tool-requiring structure which does not function to release the cable.

Bureau discloses a connector which by hand operation releases the connector from the battery post. The cable release mechanism is distinct from the battery post release and appears to require a tool for its functioning.

The connector of Krueger and Bureau as well as the connectors in widespread use today do not provide for a reliable, quick and easy means to disconnect a cable from a terminal post.

SUMMARY OF THE INVENTION

A terminal connector in accordance with the present invention includes a nonconductive housing or chassis having a dually accessed interior chamber. The chamber is fitted with an electrical conductor, such as a connector plate, to interconnect the two access openings. The first access opening is dimensioned to removably receive a battery cable. The second access opening is dimensioned to removably receive a battery post. Compression means, preferably a plurality of wedge-like members, are slidably positioned proximate said connector plate. The wedge members may be interconnected thereby facilitating joint motion. The action of the compression means operates against the housing walls to force the conductor, such as the connector plate, into tight and electrically conductive contact with the cable as well as a terminal post. This contact functions to not only retain the cable and post within the terminal connector but also effects an electrical connection of the cable with the post thereby establishing a conductive circuit. In a preferred embodiment, a hand actuated control mechanism cooperates with the compression means to initiate its motion. The control mechanism is typically nonconductive.

BRIEF DESCRIPTION OF THE DRAWINGS

In the drawings, which illustrate what is presently regarded as the best mode for carrying out the invention.

DETAILED DESCRIPTION OF THE DRAWINGS

Figure 1:
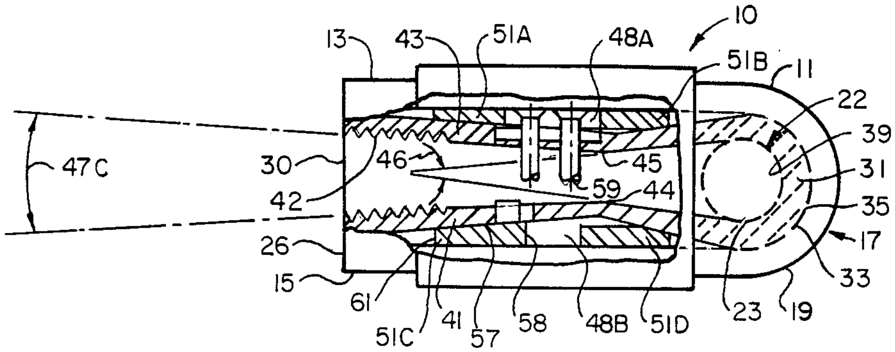
FIG. 1 is a top view of the connector of this invention having a cut-away portion showing the placement of the interior housed sliding wedge members.

A connector of this invention shown in FIG. 1, generally designated 10, includes a generally "U"-shaped, box-like housing 11. The housing 11 is made of a sturdy non-electrically conductive or insulating material that is generally not subject to electrolytic corrosion. For example, a variety of plastics or fiberglass reinforced plastics may be used. The housing 11 has two opposite sides 13 and 15 which are preferably formed to be essentially planar and essentially parallel as shown in FIG. 1.

The housing 11 has a first end surface 17 which is here shown as an arcuate or round surface 19. The housing 11 has a bottom 21 which is preferably a planar surface. At one end thereof an access opening 23 is formed to extend into the connector 10 to receive a terminal post such as the tapered terminal post 22. Access opening 23 is generally cylindrical and is dimensioned to slidably and removably receive the post 22. Many battery terminal posts extend outwardly from the battery and are formed to have a tapered configuration. Opening 23 is therefore shown tapered to admit the post while simultaneously providing a secure conforming surface against the post. It should be understood, however, that the opening 23 may be shaped to receive any desired terminal post.

Figure 3:
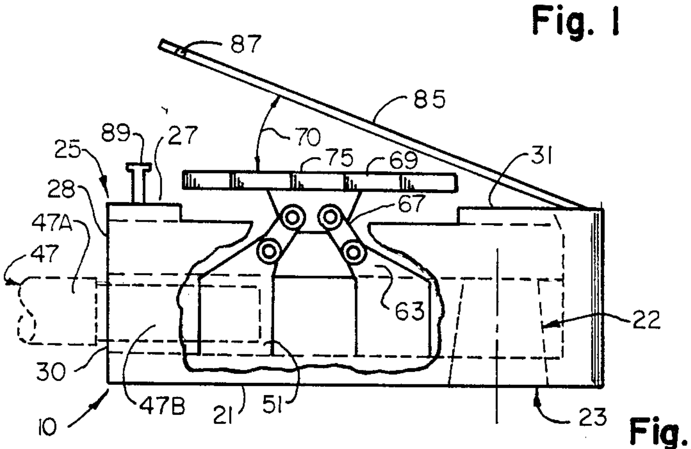
FIG. 3 is a side view of the connector of FIG. 1 illustrating the secured position of the battery cable and post.

FIG. 3 details a top member 25 of the housing 11. The top member 25 includes a first planar portion 27 located proximate the end 28 of the housing 11. A second planar portion 31 is located proximate end 17 of the housing. The top members 25 and 27 are optimal and are provided to preclude the entry of foreign matter into the connector 10.

The cable end 28 of the housing is also formed to be planar and is preferably normal to the sides 13 and 15. As shown, sides 13 and 15, ends 17 and 28, top 25 and bottom 21 define an open-ended, hollow, box-like structure. A second access opening 30, which is here shown as dimensioned to slidably receive a battery cable, is formed through the end 28 of the housing 11 to extend there into to removably and securely receive the cable, as more fully discussed hereinafter.

As stated before, the housing 11 is made of nonconductive material to contain the conductive components and to protect the user from the danger of electrical shock. The housing 11 also functions to contain any corrosive or caustic materials as typically found on the interface of a battery post and a connector positioned thereon. The housing 11 permits the user to freely operate the connector 10 without coming into contact with these materials.

Secured within the housing 11 is an approximately "U"-shaped, spring-like conductive plate 31 which is fabricated from a material suitable for conduction of electrical current. For a connector 10 suitable for use with batteries having lead or lead composition parts, the plate 31 is preferably made of lead or lead composition to minimize electrolytic corrosion.

The plate 31 has a rounded portion 33 adapted to be snugly retained against interior surface 35 at the rounded end 17 of the housing 11. The conductive plate 31 has an interior surface 39 that is rounded and is generally tapered to constitute the opening 23 to receive the battery post 22. That is, the surface 39 is tapered proximate the battery post 22 to provide for a snug fit. However, it should be understood that the dimension of this surface 39 can be varied to suit the configurations of a variety of terminal posts.

The conductive plate 31 is formed to have a first arm section 41 and second arm section 43 which preferably angulate inwardly or toward each other from the post 22 toward the cable end 28. The angulation allows for improved contact with the post 22 because the sections 41 and 43 are squeezed around the post 22 so that contact with the post 22 is effected over more than half of the perimeter of the post 22. Thus, the connector 10 is more securely affixed to the post 22 and with more surface area to effect better electrical contact. As here shown, the angulation is such that when the connector is installed and secured to a post 22, the planes of the interior surfaces of the arms between the post and a center point 44 and 45 form an angle from about 3° to about 30° and preferably about 5° to about 10°.

From the center points 44, 45, the arm sections 41 and 43 angulate outwardly toward the cable end 28 to form the cable opening 30. The interior surface of the arm sections 41, 43, which form the opening 30, have a high coefficient of friction and are preferably saw-toothed or round-toothed. The opening 30 is dimensioned at its outermost part to accept and secure the insulated portion 47A of a cable, e.g., solid core or multi-conductor cable, while simultaneously effecting a good electrical connection with the cable conductor 47B. The surfaces that form the opening 30 could be essentially parallel or round or any convenient shape to accommodate the cable. They are preferably angulated outward at an angle 47C of about 5° to about 20°. The irregular surfaces, upon being brought into contact with the inserted cable 47, function to secure the cable into the housing 11 retarding any slippage of the cable 47 out of the housing 11, while also providing a sufficient surface area contact with the conductive portion 47B of the cable 47 to ensure a good electrical connection. The arm sections 41, 43 may be spaced a sufficient distance apart to permit the insertion therebetween of a plurality of cables, such as is typically found on modern motor vehicles.

Positioned within the channels 48A and 48B formed by the conductive plate 31 and the housing sidewalls 15 and 16 is a plurality of slidable, electrically nonconductive, wedge-like members 51. In a preferred embodiment, four of the wedge members 51A, 51B, 51C, 51D are positioned with a pair of the members being located in each channel 48 as shown. Each pair 51A, 51B and 51C, 51D of wedge members is adapted to permit the members of the respective pairs to either travel toward or away from each other in the direction of the arrows 49. The wedge members 51 have generally smooth planar surfaces and are positioned to be in general alignment with the interior walls of the sides 13 and 15. Each wedge has an inclined surface 57 for contacting the connector plate 31. Generally the wedges 51 have a wider section 58 located near the central portion 59 of the housing 11 and a narrow section 61 positioned toward one of the ends of the housing 11. In a preferred embodiment, each wedge member 51 may include a mounting member 63 which extends from the wedge member a sufficient distance to access an actuating means.

As shown in FIG. 3, each mounting member 63 is pivotedly connected by means of journaled shafts to a linkage member 67 which is also pivotedly connected by means of journaled shafts with an actuating button member 69. Button member 69 is preferably fabricated from a non-electrically conductive material similar to the housing 11. As shown, the button member 69 is permitted to move toward and away from the housing 11, as shown by the arrow 70. A downward motion by the button 69 operates to forceably cause the connected wedge members 51 to slide outwardly toward the respective ends 17, 28 of the housing 11. The button's upward motion functions to bring the wedges 51 toward the central portion 59 of the housing 11.

The "closing" outward motion of the wedges 51 (downward movement of button 69) causes the connector plate 31 to be forced into a restraining contact simultaneously with the battery post 22 and the battery cable 47. Similarly, an inward, i.e., toward the housing interior 59, "opening" motion of the wedges 51 (upward movement of button 69) results in the release of pressure against the connector plate 31 thereby releasing the grip pressure on the post 22 and cable 47. This pressure release permits the removal of the cable 47 as well as the removal of the connector 10 from the post 22.

The terminal posts of batteries typically are manufactured from relatively soft metals. Resultingly, the posts are subject to considerable wear. The structure of this invention adapts to this condition in that the action of the wedges offers a multitude of constriction settings. The greater the button's (69) motion, the greater the constriction (grip) obtained. As the circumference of the post 22 is eroded through use, the button 69 is pushed increasingly more downward to lessen the circumference (perimeter) of the aperture 23 and to ensure a tight grip on and electrical connection to the post.

Figure 2:
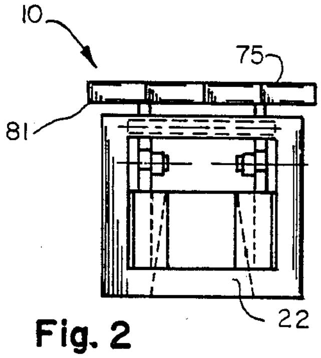
FIG. 2 is an end view of the connector of FIG. 1 detailing the pivoted actuating arms of the wedge members.

The actuating button 69 is adapted to present a planar top surface 75 which may form a substantially flat surface with the top of the housing 27 when the button 69 is in its lowermost position. The button 69 is grippable by a user by means of the extending portion 81 of the button 69 which extends beyond the sides of the housing 11 as shown in FIG. 2, and thereby defines a grasping surface. The button 69 in its lowermost position may be flush with the housing top surface to hamper an accidential disjuncture of the connector.

An optional securing means may be used to retain the button 69 securely in its closed position. An example of such means may include a manually operated latch or restraint member 85. The latch 85 is rotatively mounted on the housing 11 and is adapted to be positioned over the button 69 when the button 69 is in its closed position. The latch 85 is then manually locked into place by interacting a first connection means 87 on the latch, e.g., a slotted aperture with a second connection means 89 mounted on the housing 11. A typical second connection means may include a bolt member whose shaft diameter is dimensioned to fit and be retained within said slotted aperture.

Figure 4:
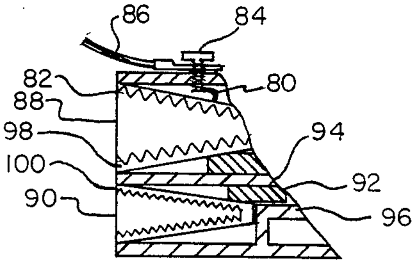
FIG. 4 is a top view, having a cut away portion, of an alternate connector of this invention showing a structure adapted for receiving a plurality of cables.
Figure 5:
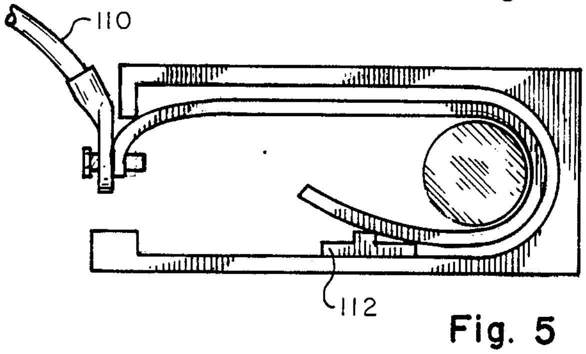
FIG. 5 is a top view of another version of the connector of this invention.

FIG. 4 is a cross sectional view of a part of a connector providing for the connection of one or more cables. As one alternative, a wire or spring band 80 can be conductively connected to an arm 82 and to a post 84 for connection to a wire or cable 86 in a conventional manner. As another alternative, the cable opening 88 may be sized to receive more than one cable. As yet another alternative, an additional opening 90 may be formed to receive a cable or wire. It can be quickly disconnected in a fashion similar to that described for connector 10 of FIGS. 1-3 by providing a wedge 92 to operate against appropriate housing surfaces 94 and 96. It may also be desirable to operate arms 98 and 100 with one wedge.

Figure 6:
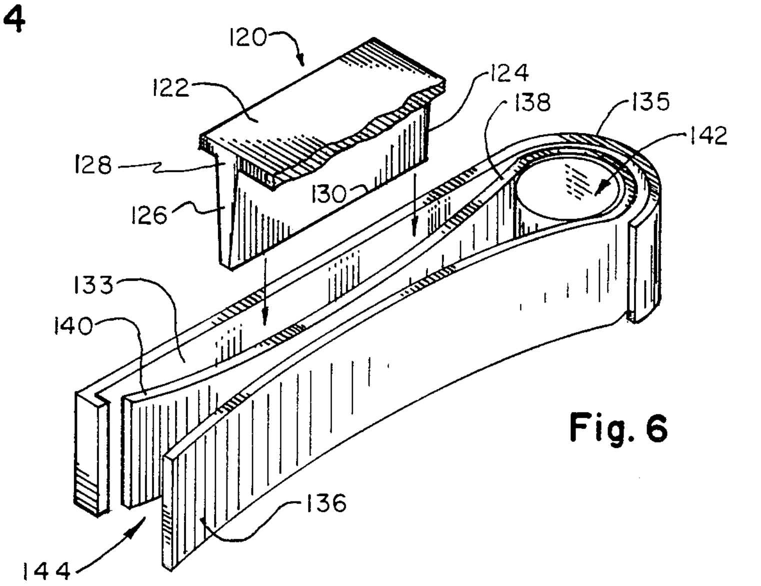
FIG. 6 is a partial side elevational view of still another connector in accordance with this invention.

It should also be recognized that a connector can be formed with a cable 110 bolted or soldered thereto with a button mechanism connected to one wedge 112 as shown in FIG. 6.

FIG. 6 illustrates an alternate embodiment in which a wedge 120 has a button or handle 122. The wedge 120 has arcuate outside edges 124 and has a decreasing thickness 126 from its top 128 to its botton 130. As the wedge 120 is urged downward 132 into the space 133 between the chassis 135 and the substantially "U"-shaped conductor 136. The outside edge 124 and increasing thickness 126 cause the first portion 138 and second portion of the conductor 136 to be squeezed respectively about the terminal post 142 and cable (not shown) which is to be inserted into the opening or aperture 144. Two wedges 120 may be used, if desired.

It is to be understood that the embodiments herein described are merely illustrative of the principals of the invention. Reference herein to the details of the illustrated embodiments is not intended to limit the scope of the claims, which themselves recite those features regarded as essential to the invention.

I claim:

1. A connector for electrical conductive connection to a terminal post, said connector comprising:
- a nonconductive chassis;
- a conductor positioned within said chassis and formed to removably fit about, but not entirely surround, a terminal post for conductive connection thereto, said conductor being formed with an extension which extends away from said post substantially normal thereto, said extension formed to be spring-like;
- compression means in mechanical association with said chassis and operable to move said extension to tighten and loosen said conductor means about said post, wherein said compression means include wedge means movable between a first position in which the wedge means urges the extension to tighten it about the terminal post, and a second position in which the wedge means does not urge the extension to tighten it about the said post so that said connector can be positioned on and removed from said terminal post; and
- cable security means to conductively connect a cable to said conductor.

2. The connector of claim 1 wherein said cable securing means includes:
- the said extension which is formed to have a first portion that is spring-like to extend from said post angularly inward to a midpoint and a second portion that is spring-like to extend angularly outward from said midpoint to its distal end;
- the said chassis positioned with respect to the said second portion to form an aperture sized to receive the conductor of said cable;
- said wedge means being operable so that when in said first position said cable is securely gripped between said second portion and said chassis and conductively connected to said extension, and in said second position said cable is loosened for removal from said aperture.

3. A connector for electrical conductive connection to a terminal post, said connector comprising:
- a nonconductive chassis;

a conductor positioned within said chassis and formed to removably fit about, but not entirely surround, a terminal post for conductive connection thereto, said conductor being formed with an extension which extends away from said post substantially normal thereto, said extension formed to be spring-like;

compression means in mechanical association with said chassis and operable to move said extension to tighten and loosen said conductor means about said post; and cable securing means to conductively connect a cable to said conductor; wherein said conductor is essentially key-hole like in plan or shape to form an open sided aperture for receiving a terminal post with two extensions which extend substantially normal away from the post, each of said extensions having a first portion that angulates inwardly from said post to a midpoint and a second portion that angulates outwardly from the midpoint to their distal ends, said second portions of said extensions forming an aperture to removably receive conductively a cable therein, and wherein said compression means urges the first portion and second portion of at least one extension to grip conductively said cable and said post.

4. The connector of claim 3 wherein said second portion of said extensions are formed to have cable gripping means to grip the insulation of said cable and to grip the conductive portion of said cable.

5. The connector of claim 3 wherein said compression means includes wedge means positionable between the chassis and an extension.

6. The connector of claim 5 wherein said wedge means includes a first pair of wedges positionable between the chassis and an extension and a second pair of wedges positionable between the chassis and the other extension, with each wedge being connected by journaled lever members to a button positioned above said chassis so that upon movement of said button toward said chassis the one of each pair of wedges are substantially simultaneously and slidably urged along said first portion toward said post and the other of each pair of wedges are slidably urged along said second portion toward the distal end of said extensions.

7. A connector for electrical conductive connection to a terminal post, said connector comprising:

a nonconductive chassis;

a conductor positioned within said chassis and formed to removably fit about, but not entirely surround, a terminal post for conductive connection thereto, said conductor being formed with an extension which extends away from said post substantially normal thereto, said extension formed to be spring-like;

compression means in mechanical association with said chassis and operable to move said extension to tighten and loosen said conductor means about said post; and cable securing means to conductively connect a cable to said conductor; wherein said chassis is formed of a nonconductive, substantially rigid, material and to be essentially a closed structure with a first opening to receive said terminal post and a second opening to receive said cable and with openings to operably receive said compression means.

8. A battery terminal connector comprising:

an essentially "U"-shaped, substantially elastic electrically conductive plate having a substantially annular portion for removable connection to a terminal post of a battery;

a chassis formed of nonconductive material and adapted to retain said plate, said chassis having a base including a means to receive and secure a battery cable in electrical contact with said plate, said chassis having a means to receive a battery terminal post;

a plurality of wedge-like members positioned between said chassis and said plate, said wedge-like members adapted to slide reciprocatingly so as to alternately force said plate to embrace said terminal post or release said embrasure.

9. A battery terminal connector comprising:

an approximately "U"-shaped, resilient plate capable of conducting electrical current, said plate having dual arms adapted to receive and releasably embrace a battery cable, said arms being fitted with surfaces having a high coefficient of friction, said plate possessing an elastically collapsible substantially annular tapered portion adapted to receive and releasably embrace a battery terminal post;

a hollow non-electrical conductive chassis member defining an interior recess chamber adapted to substantially enclose and retain said plate, said chassis member presenting a first access opening to said recess chamber dimensioned to slidably receive a battery cable, said chassis member also possessing a second access tapered opening to said chamber dimensioned to receive said battery terminal post, said recess chamber in conjunction with said plate member defining a pair of opposing parallel channels;

a first pair of wedge-like members positioned slidably and reciprocatingly in said recess chamber, each of said wedge-like members being positioned in one of said channels such that one side of said wedge member contacts said chassis member while an opposing side contacts said plate member whereby a sliding motion of said wedge member either forces said plate to contact and restrain said battery post or alternately release said contact and restraint;

a second pair of wedge members similarly positioned slidably and reciprocatingly in said opposing channels of said recess chamber, whereby one side of said wedge member contacts said chassis member while an opposing side contacts said plate member whereby a sliding motion of said second pair of wedge members operates to either force said plate arms to releasably conductively embrace and restrain said battery cable or alternately release said embrasure and restraint;

a plurality of linkage arms, each arm being pivotedly mounted to a respective wedge member;

an nonconductive actuating plate pivotedly mounted on said plurality of linkage arms whereby the motion of said actuating plate operates to cause said wedge members to slide in said channels.

10. The connector of claim 1 wherein a securement means is mounted on said connector and is adapted to releasably retain said actuating plate in position.

* * * * *